United States Patent
Jin

(10) Patent No.: US 8,089,951 B2
(45) Date of Patent: Jan. 3, 2012

(54) METHOD OF TRANSFERRING TIMING INFORMATION OVER PACKET NETWORK

(75) Inventor: Gary Jin, Kanata (CA)

(73) Assignee: Microsemi Semiconductor Corp., Kanata, ON (CA)

( * ) Notice: Subject to any disclaimer, the term of this patent is extended or adjusted under 35 U.S.C. 154(b) by 89 days.

(21) Appl. No.: 12/542,148

(22) Filed: Aug. 17, 2009

(65) Prior Publication Data

US 2010/0054283 A1    Mar. 4, 2010

(30) Foreign Application Priority Data

Aug. 26, 2008  (GB) .................................. 0815458.5

(51) Int. Cl.
*H04J 3/06*  (2006.01)
(52) U.S. Cl. ........................................ 370/350; 370/503
(58) Field of Classification Search .................. 370/304, 370/350, 503–520
See application file for complete search history.

(56) References Cited

U.S. PATENT DOCUMENTS

| | | | |
|---|---|---|---|
| 5,276,706 A * | 1/1994 | Critchlow | 375/343 |
| 6,698,022 B1 * | 2/2004 | Wu | 725/111 |
| 7,502,953 B2 * | 3/2009 | Boecker et al. | 713/400 |
| 7,792,158 B1 * | 9/2010 | Cho et al. | 370/518 |
| 2005/0041692 A1 * | 2/2005 | Kallstenius | 370/503 |
| 2008/0130808 A1 * | 6/2008 | Ma | 375/354 |
| 2008/0151761 A1 * | 6/2008 | Theisen et al. | 370/241 |
| 2009/0060108 A1 * | 3/2009 | Hafuka | 375/371 |
| 2010/0183034 A1 * | 7/2010 | Kroepfl et al. | 370/503 |

* cited by examiner

*Primary Examiner* — Kwang B Yao
*Assistant Examiner* — Juvena Loo
(74) *Attorney, Agent, or Firm* — Marks & Clerk; Richard J. Mitchell

(57) ABSTRACT

Timing information is transmitted over a network by sending time-stamped packets between a transmitter and receiver. The time-stamped packets are used to compute an estimate of the frequency deviation between the transmitter clock and the receiver clock. The local receiver clock is periodically updated to match the transmitter clock based on the estimate, which is preferably a least squares estimate. A multiple window approach is employed to increase update speed.

15 Claims, 3 Drawing Sheets

METHOD OF TRANSFERRING TIMING INFORMATION OVER PACKET NETWORK

FIELD OF THE INVENTION

This invention relates to the transfer of timing information over packet networks, and more particularly to a method wherein timestamps are sent from the transmitter to the receiver to enable synchronization of the receiver.

BACKGROUND OF THE INVENTION

In order to send time sensitive information, such as voice and video data, over asynchronous networks, some means must be employed or transferring timing information between the transmitting and receiving end. Timing-over-Packet (ToP) technology enables accurate timing and synchronization to be distributed across asynchronous packet infrastructures, allowing carriers to confidently support time-critical services over packet networks.

A network including ToP technology is shown in FIG. 1. The transmitter side includes a digital controlled oscillator (DCO) referenced to a local oscillator at the transmitter. The center frequency (CF) of the DCO at the transmitter side is set by a digital word. The output of the DCO depends on the set center frequency and the frequency of the local oscillator at the transmitter side. A time stamp $n_{tx}$, which is the phase of master DCO clock, is transmitted to the receiver, which also contains a DCO referenced to a local oscillator at the receiver and set at the same center frequency CF as the transmitter. However, if the frequency of the local oscillator at the receiver is different from the frequency of the local oscillator at the transmitter, the output of the DCO at the receiver will be different from the output of the DCO at the transmitter. The objective is to make the output frequency of the DCO at the receiver the same as the output frequency of the DCO at the receiver. This is achieved by adjusting the center frequency of the receiver DCO to take into account the difference in local oscillator frequencies.

At receiver side, the processor compares the transmitter time stamp with a local generated time stamp from the receiver DCO. The difference in time stamp, which is called transit time, is used to adjust receiver center frequency of the receiver DCO so that it will be synchronized with the master DCO.

To minimize the impact on data transmission, the transmission rate for timing packets, i.e. packets with time stamp information, has to be limited so that it is much smaller than the network data rate. In order to provide an accurate update of the receiver DCO, a large amount of data needs to be collected, and at a low transmission rate, this can take considerable time.

SUMMARY OF THE INVENTION

The invention computes an estimate of the frequency deviation by an accurate method, such as the least squares method or the recursive least square method.

Thus, in accordance with one aspect of the invention there is provided a method of transferring timing information over a network between a transmitter and receiver, comprising generating a clock signals with a first digital controlled oscillator having a set center frequency at the transmitter based on a local oscillator at the transmitter; generating clock signals at the receiver with a digital controlled oscillator having a set center frequency based on a local oscillator at the receiver; sending time-stamped packets derived from the local transmitter clock to the receiver; creating time-stamped packets at the receiver containing timing information derived from the local receiver clock; processing said time-stamped packets to compute an estimate of the frequency deviation between the transmitter clock and the receiver clock; adjusting the center frequency of the digital controlled oscillator at the receiver so that it is synchronized with the digital controlled oscillator at the receiver, and wherein an overlapping multi-window approach is adopted wherein data adjustment blocks compute frequency adjustments from timing data accumulating during overlapping time intervals, and the data adjustment blocks take turns to output frequency adjustment data for the digital controlled oscillator at the receiver every T/M time intervals, where T is the time required to collect enough data to make an adjustment with a single adjustment block, and M is the number of adjustment blocks.

The novel method in accordance with the invention allows the local clock to track the reference clock through unknown network with minimum error. The Least Square method is an effective solution for a general unknown network delay distribution as it is very robust and accurate Embodiments of the invention use a multi-window least squares approach to solve the problem. Multiple over-lapped windows are used for information collection. The DCO is updated when one of data collection windows reaches its full capacity. The other data windows are compensated when DCO is updated.

In accordance with another aspect of the invention there is provided an apparatus for updating the set frequency of a digital controlled oscillator at a receiver for timing recovery in an asynchronous packet network, comprising: a plurality of data accumulation blocks for accumulating timing data from time-stamped packets transmitted through a packet network from a transmitter; a plurality of adjustment blocks for computing an estimate of the frequency deviation from said accumulated timing data; and an updater for periodically updating said set frequency based on said computed estimate to synchronize said digital controlled oscillator at the receiver with a digital controlled oscillator at the transmitter; and wherein the data adjustment blocks are configured to compute frequency adjustments from timing data accumulating during overlapping time intervals, and the data adjustment blocks are configured to take turns to output frequency adjustment data for the digital controlled oscillator at the receiver every T/M time intervals, where T is the time required to collect enough data to make an adjustment with a single adjustment block, and M is the number of adjustment blocks.

BRIEF DESCRIPTION OF THE DRAWINGS

The present invention will now be described in more detail, by way of example only, with reference to the accompanying drawings, in which.

DETAILED DESCRIPTION OF THE PREFERRED EMBODIMENTS

The general expression for the time stamps can be expressed as:

$$n_{tx} = k \cdot T \cdot f_{tx},$$

$$n_{rx} = (k \cdot T + \Delta_k) \cdot f_{rx} + \Phi$$

where $n_{tx}$ and $n_{rx}$ are time stamps of packet at transmitter and receiver side respectively, with $f_{tx}$ and $f_{rx}$ as the respective DCO frequencies. T is the time interval between two consecutive timing packets and k is the index. If $\Delta_k$ is the network delay and $\Phi$ is the initial phase offset between the transmitter DCO and the receiver DCO, the transit time is the difference between $n_{tx}$ and $n_{rx}$.

This transit time can be expressed as:

$$n_{tx}n_{rx} = k \cdot T \cdot (f_{tx} - f_{rx}) + \Delta_k \cdot f_{rx} + \Phi$$

where $y_k = n_{tx} - n_{rx}$ is the transit time, $$\alpha = 1 - \frac{f_{rx}}{f_{tx}}$$

is the frequency deviation of interest, ($10^6 \cdot \alpha$ is the deviation of the local clock in ppm), $x_k = k \cdot T \cdot f_{tx}$ is the transmitter timestamp, and $v_k = \Delta_k \cdot f_{rx} + \Phi$ is the noise containing the network delay as the noise source. Since $f_{rx}$ remains relatively constant with only a small change during a DCO update, $v_k$ mostly represents the network delay variation with a phase offset. The estimate can now be reduced to $$y_k = \alpha \cdot x_k + v_k$$

In order to adjust the DCO frequency, it is important to estimate $\alpha$, in which case the required DCO frequency adjustment is $\alpha \cdot f_{tx}$) which is given by the expression $$\hat{\alpha} = \arg\left\{\min_\alpha \left[\sum_k (y_k - \alpha \cdot x_k)^2\right]\right\}$$

Assuming N items of data are collected, the solution is $$\hat{\alpha} = \frac{\sum x_k y_k - \frac{1}{N} \sum x_k \sum y_k}{\sum x_k^2 - \frac{1}{N} (\sum x_k)^2}$$

Figure 1:
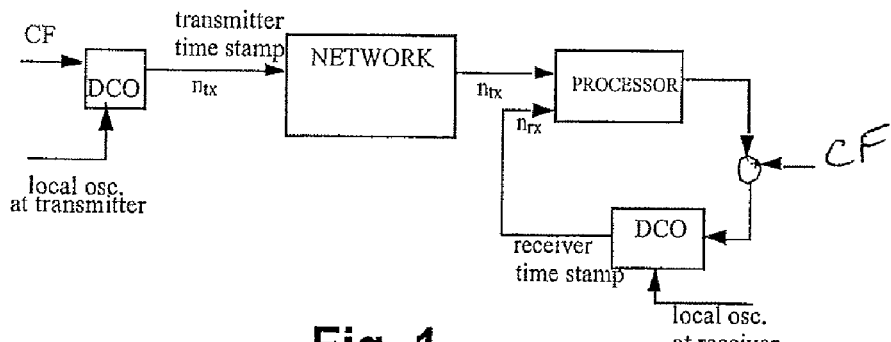
FIG. 1 is a block diagram of a timing-over-pact synchronization system.
Figure 2:
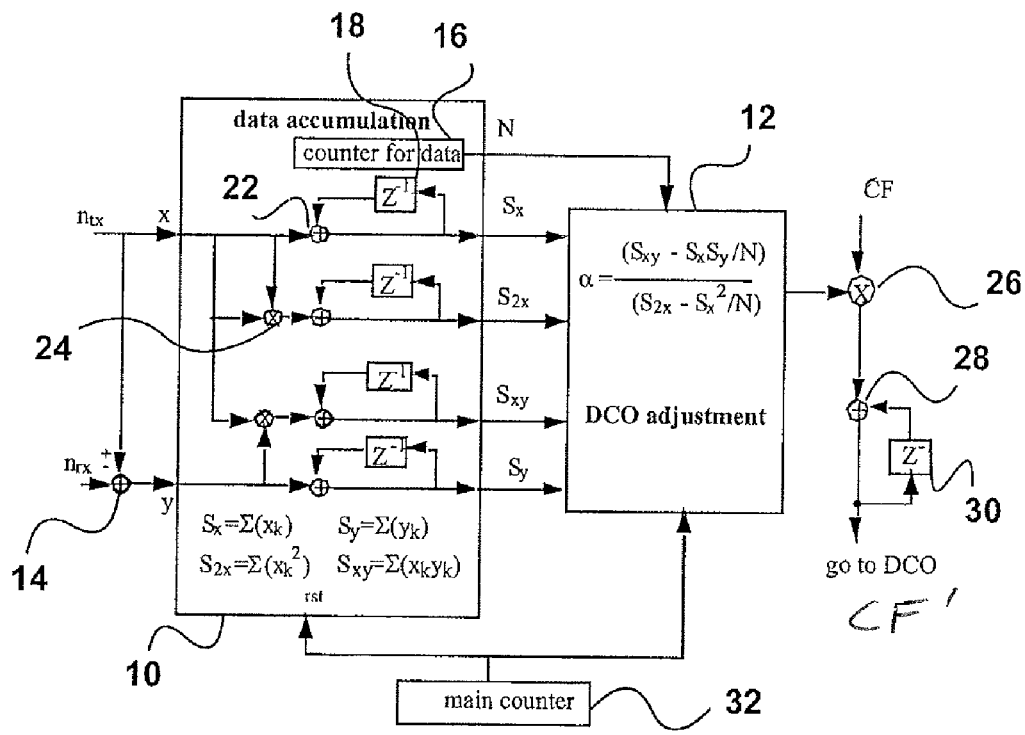
FIG. 2 is block diagram of a ToP processor implementing a Least Squares solution.

A processor for implementing this solution is shown in FIG. 2. The DCO at the transmitter side is nominally set at the same center frequency CF as the DCO at the receiver side. Due to the difference in local oscillator frequencies at the transmitter and receiver, the output frequencies of the DCOs will be slightly different. In accordance with embodiments of the invention, the nominal center frequency CF at the receiver is adjusted prior to input to the DCO at the receiver so that the receiver DCO output frequency is the same as the transmitter DCO output frequency.

In FIG. 2, data accumulation block 10 receives inputs $n_{tx}$ and $n_{rx}$ and outputs N, $S_x$, $S_{2x}$, $S_{xy}$, and $S_y$ to DCO adjustment block 12, where $S_x = \Sigma(x_k)$, $S_{xy} = \Sigma(x_k y_k)$, $S_{2x} = \Sigma(x_k^2)$ and $S_y = \Sigma(y_k)$. Input $n_{rx}$ is subtracted from input $n_{tx}$ by subtractor 14 to derive the difference $n_{tx} - n_{rx}$, which is the transit time for the time stamped packets. The data accumulation block also includes counter 16 for counting the number of data items N, delay units 18, and reset input 20, as well as adders 22 and multipliers 24. The DCO adjustment block outputs the result a to multiplier 26, where it is multiplied by the set center frequency (CF) in multiplier 26, passed through adder 28 with delay circuit 30 providing delayed feedback, and fed to the DCO as the adjusted DCO center frequency CF'.

The data accumulation block 10 collects every timing packet with transmitter timestamp and receiver timestamp, and updates $S_x$, $S_y$, $S_{xy}$ and $S_{2x}$. The number of data collected is stored in the main counter 32. When the main counter 32 reaches a pre-set time limited (T), DCO adjustment value is calculated with the number of collected data in that time interval (N). In the meantime, the main counter 32 is reset to zero and all memories and the data counter in the data accumulation block 10 are reset to zero.

When the network traffic is heavy and the network delay has a large variation, more data is required for an accurate clock estimation, which means that the clock update takes a longer time. This is especially true if the timing packet is only transmitted at a low rate. In order to update the DCO more often while maintaining the same window size, an embodiment of the invention employs a novel multi-window approach, which is shown in FIG. 3.

Figure 3:
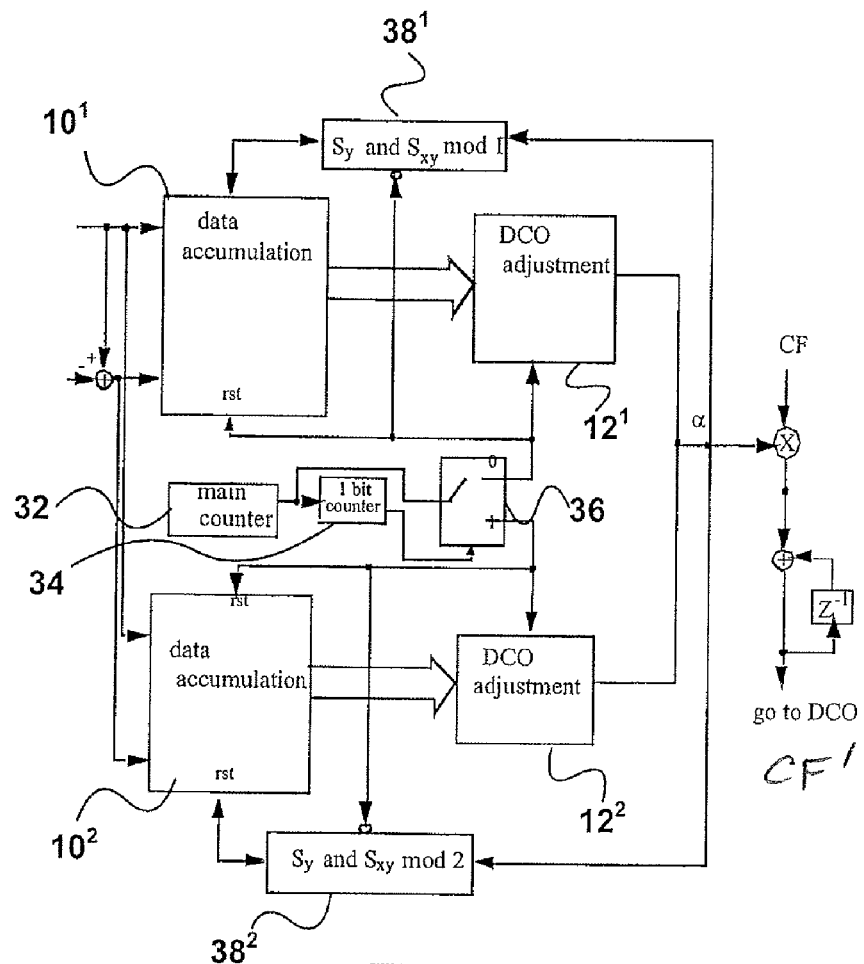
FIG. 3 is block diagram of a ToP processor implementing an over-lapped Least Squares solution.

In FIG. 3, there are two data accumulation blocks 101, 102 and two DCO adjustment blocks 12¹, 12². When the main counter 32 reaches the time limit, the two DCO adjustment blocks 10¹, 10² takes turns to make DCO adjustments based on the output of 1 bit counter 34, which alternates between selecting DCO adjustment block 12¹ and DCO adjustment block 12² through selection unit 36. The data accumulation blocks 10¹, 10² are reset alternately.

If each DCO update requires time interval T to make an accurate DCO adjustment with enough timing packets being collected, the DCO adjustment can be done with double speed, i.e., adjusted every T/2 time interval. When DCO adjustment block 12¹ is in the process of adjusting DCO with information collected by data accumulation block 10¹ in the past time interval T, data accumulation block 10² only accumulates information from its first T1=T/2 of time interval, and vice verse.

Figure 4:
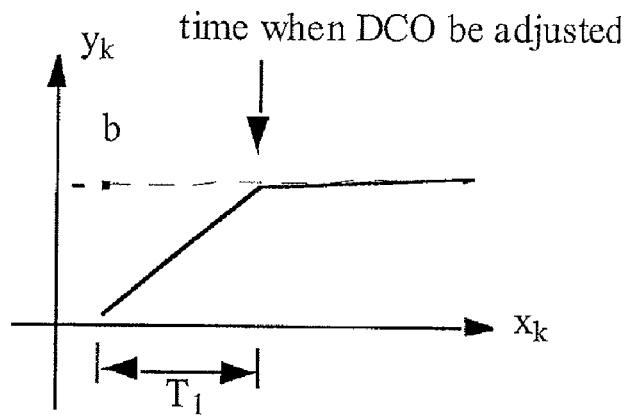
FIG. 4 is a graph helpful in understanding the data adjustment after a DCO update.

When DCO adjustment block 12¹ calculates the DCO adjustment, data accumulation block 10¹ will be reset, but data accumulation block 10² is half way through data collection, which means that it has different frequency deviation before and after that time. Thus, adjustment has to be made for variables in the data accumulation blocks. Let the transit time and transmitter time stamp relationship be $$y_k = \alpha \cdot x_k + v_k$$

before adjustment and $$y_k = \alpha_1 \cdot x_k + v_k + b$$

after adjustment as shown in FIG. 4.

In order to match the previous collected data to the later data, some adjustments have to be made to $S_y$ and $S_{xy}$. ($S_x$ and $S_{2x}$ will be unaffected). For a known DCO adjustment $\alpha_1 - \alpha$, the adjustments for $S_y$ and $S_{xy}$ are:

$$S_y = S_y + (\alpha_1 - \alpha)(S_x - T_1)$$

$$S_{xy} = S_{xy} + (\alpha_1 - \alpha)(S_{2x} - T_1 \cdot S_x)$$

where $T_1$ is the time elapsed during the data collection of $S_y$, $S_{xy}$, $S_x$ and $S_{2x}$ in units of transmitter time stamp. $T_1$ can also be obtained by taking the difference between the largest time stamp value in $S_x$ and the smallest one.

Blocks 38¹ and 38² update the respective data accumulation blocks accordingly.

From FIG. 4, it will be seen that without compensation, the next frequency estimate will be larger than the accurate value because the phase slope is still positive even the local DCO frequency is already accurate after $T_1$. This will cause phase overshooting and the estimated frequency swing around the true values for a long time. Or even worse, in some cases frequency convergence will never be reached.

A similar scheme to that described with reference to FIG. 3 can be extended to a multi-windows approach, where M overlapping windows are employed. Such a scheme, which is shown in FIG. 5, increases the DCO update speed by M times while maintaining the same estimate window size for data collection.

Figure 5:
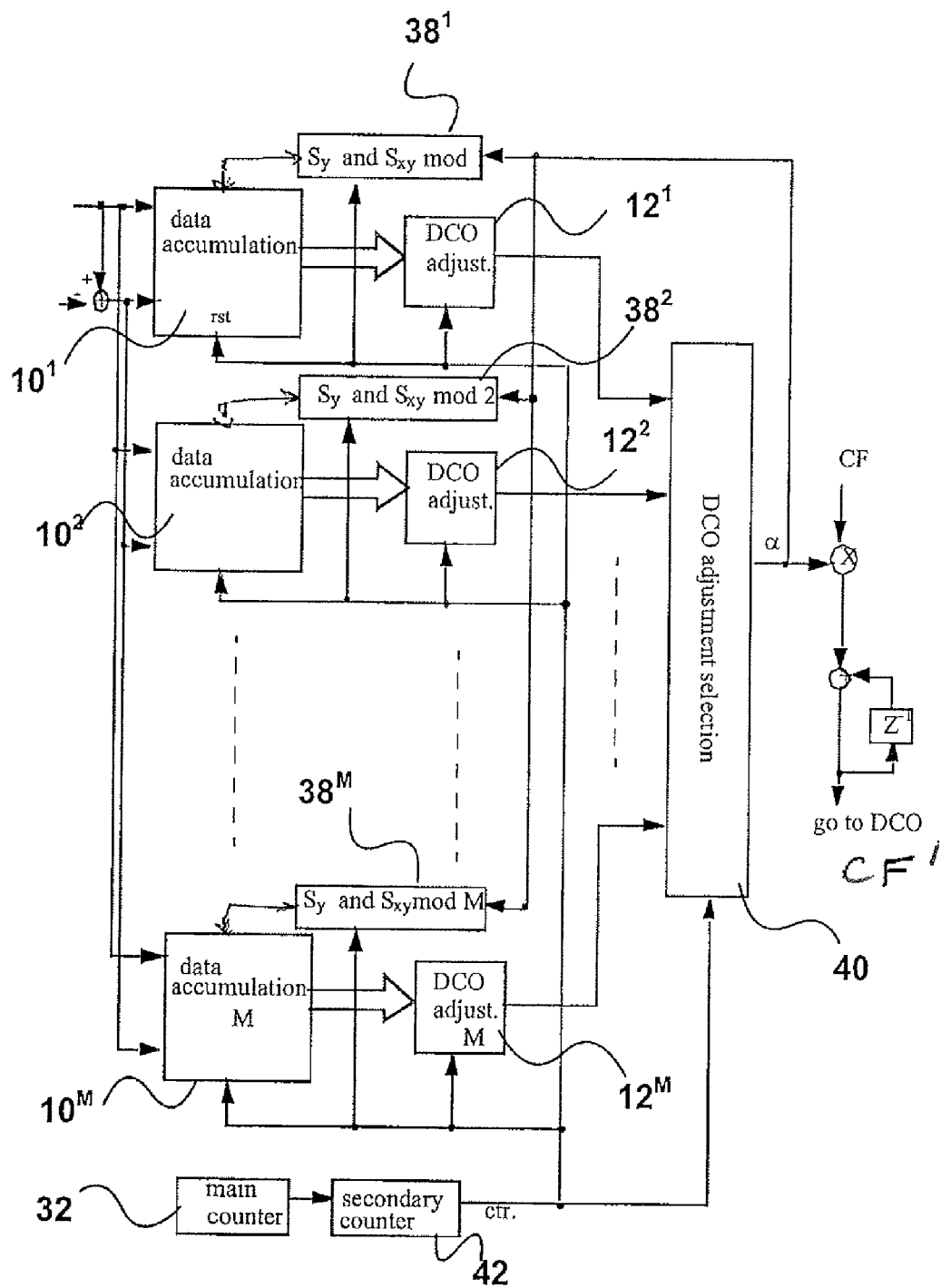
FIG. 5 is block diagram of a ToP processor implementing a multi-stage over-lapped Least Squares solution.

In the embodiment shown in FIG. 5, there are M data accumulation blocks $10^1, 10^2, \ldots 10^M$) M data adjustment blocks $12^1, 12^2 \ldots 12^M$) M variable adjustment units $38^1 \ldots 38^M$, and DCO adjustment selection block 40 for selecting an output from one of the DCO adjustment blocks $12^1, 12^2 \ldots 12^M$.

The embodiment shown in FIG. 5 works in a similar manner to the embodiment described with reference to FIG. 3, except the selection block selects the appropriate data adjustment block $12^1, 12^2 \ldots 12^M$ for output to use for adjustment of the DCO.

When the main counter 32 reaches time limit T/M, the secondary counter 42, which has an output m that counts from 1 to M, controls selects DCO adjustment block $12^m$ to update the DCO. Its corresponding data accumulation block $10^m$ is also updated. At that time, all memories in the data accumulation m are reset and other data accumulation blocks update their $S_y$ and $S_{xy}$ because of the DCO adjustment (as shown in FIG. 4). In this scheme, the DCO adjustment will be based on a block of timing packets collected in the time interval T. As a result, the DCO will be updated M times faster.

The described embodiments provide a low cost implementation of timing-over-packet technology, while offering network synchronization with accurate frequency estimates and fast DCO updates. Embodiments of the invention also offer fast and accurate lock without overshooting. The method can be extended to other accurate estimate methods, such as the recursive least square estimate method.

It should be appreciated by those skilled in the art that any block diagrams herein represent conceptual views of illustrative circuitry embodying the principles of the invention. For example, a processor may be provided through the use of dedicated hardware as well as hardware capable of executing software in association with appropriate software. When provided by a processor, the functions may be provided by a single dedicated processor, by a single shared processor, or by a plurality of individual processors, some of which may be shared. Moreover, explicit use of the term "processor" should not be construed to refer exclusively to hardware capable of executing software, and may implicitly include, without limitation, digital signal processor (DSP) hardware, network processor, application specific integrated circuit (ASIC), field programmable gate array (FPGA), read only memory (ROM) for storing software, random access memory (RAM), and non volatile storage. Other hardware, conventional and/or custom, may also be included.

The invention claimed is:

1. A method of transferring timing information over a network between a transmitter and receiver, comprising:
generating a clock signals with a first digital controlled oscillator having a set center frequency at the transmitter based on a local oscillator at the transmitter;
generating clock signals at the receiver with a digital controlled oscillator having a set center frequency based on a local oscillator at the receiver;
sending time-stamped packets derived from the local transmitter clock to the receiver;
creating time-stamped packets at the receiver containing timing information derived from the local receiver clock;
processing said time-stamped packets to compute an estimate of the frequency deviation between the transmitter clock and the receiver clock;
adjusting the center frequency of the digital controlled oscillator at the receiver so that it is synchronized with the digital controlled oscillator at the receiver, and
wherein an overlapping multi-window approach is adopted wherein data adjustment blocks compute frequency adjustments from timing data accumulating during overlapping time intervals, and the data adjustment blocks take turns to output frequency adjustment data for the digital controlled oscillator at the receiver every T/M time intervals, where T is the time required to collect enough data to make an adjustment with a single adjustment block, and M is the number of adjustment blocks, and
wherein an adjustment block is reset after outputting a frequency adjustment to update the local receiver clock, and variables stored in remaining adjustment blocks are adjusted to compensate for the updating of the local receiver clock, and wherein the compensation adjustments for variables $S_y$ and $S_{xy}$ stored in an adjustment block are given by the expressions $$S_y = S_y + (\alpha_1 - \alpha)(S_x - T_1)$$

$$S_{xy} = S_{xy} + (\alpha_1 - \alpha)(S_{2x} - T_1 \cdot S_x)$$

where $T_1$ is the time elapsed during the data collection of $S_y$, $S_{xy}$, $S_x$ and $S_{2x}$, and $S_x = \Sigma(x_k)$, $S_{xy} = \Sigma(x_k y_k)$, $S_{2x} = \Sigma(x_k^2)$, and $S_y = \Sigma(y_k)$.

2. A method as claimed in claim 1, wherein the transit time over said network is computed from the difference between the transmitter time-stamped packets and the receiver time-stamped packets, and said estimate is computed from transit time.

3. A method as claimed in claim 1, wherein said estimate is a computed least squares estimate.

4. A method as claimed in claim 3, wherein said estimate is a computed recursive least square estimate.

5. A method as claimed in claim 3, wherein the least squares estimate a is computed in accordance with the formula:

$$\hat{\alpha} = \frac{\sum x_k y_k - \frac{1}{N} \sum x_k \sum y_k}{\sum x_k^2 - \frac{1}{N} (\sum x_k)^2}$$

where $x_k = k \cdot T \cdot f_{tx}$, $y_k = \alpha \cdot x_k + v_k$, where k is an index, T is the time interval between consecutive timing packets, and $v_k$ represents the network delay variation plus a phase offset.

6. An apparatus for updating the set frequency of a digital controlled oscillator at a receiver for timing recovery in an asynchronous packet network, comprising:
a plurality of data accumulation blocks for accumulating timing data from time-stamped packets transmitted through a packet network from a transmitter;
a plurality of adjustment blocks for computing an estimate of the frequency deviation from said accumulated timing data; and
an updater for periodically updating said set frequency based on said computed estimate to synchronize said digital controlled oscillator at the receiver with a digital controlled oscillator at the transmitter; and wherein the data adjustment blocks are configured to compute frequency adjustments from timing data accumulating during overlapping time intervals, and the data adjustment blocks are configured to take turns to output frequency adjustment data for the digital controlled oscillator at the receiver every T/M time intervals, where T is the time required to collect enough data to make an adjustment with a single adjustment block, and M is the number of adjustment blocks, and wherein the data accumulation blocks are reset after their output has been used to update the local oscillator, and wherein the apparatus further comprises a unit for changing at least some variables in the remaining data accumulation block(s) to compensate for the different frequency deviation, and wherein the compensation adjustments for variables $S_y$ and $S_{xy}$ stored in an adjustment block are given by the expressions $$S_y = S_y + (\alpha_1 - \alpha)(S_x - T_1)$$

$$S_{xy} = S_{xy} + (\alpha_1 - \alpha)(S_{2x} - T_1 \cdot S_x)$$

where $T_1$ is the time elapsed during the data collection of $S_y$, $S_{xy}$, $S_x$ and $S_{2x}$, and $S_x = \Sigma(x_k)$, $S_{xy} = \Sigma(x_k y_k)$, $S_{2x} = \Sigma(x_k^2)$, and $S_y = \Sigma(y_k)$.

7. An apparatus as claimed in claim 6, further comprising a main counter for counting a predetermined number of time-stamped packets and outputting data from an adjustment block when the counter reaches a preset value representing the number of time-stamped packets required to provide a valid update for the local oscillator.

8. An apparatus as claimed in claim 7, further comprising a selection unit for switching between said data adjustment blocks.

9. An apparatus as claimed in claim 8, comprising two said data accumulation blocks and two said adjustment blocks, and wherein said selection includes a 1-bit counter.

10. An apparatus as claimed in claim 6, wherein M is a number greater than 2.

11. An apparatus as claimed in claim 10, wherein said selection unit includes a secondary counter that counts up to M.

12. A method of recovering timing information over a network between a transmitter and receiver, comprising:

generating clock signals at the receiver with a digital controlled oscillator having a set center frequency based on a local oscillator at the receiver;

receiving time-stamped packets derived from a local clock at the transmitter;

creating time-stamped packets at the receiver containing timing information derived from the local receiver clock;

processing said time-stamped packets to compute an estimate of the frequency deviation between the transmitter clock and the receiver clock;

adjusting the center frequency of the digital controlled oscillator at the receiver so that it is synchronized with the digital controlled oscillator at the receiver, and wherein an overlapping multi-window approach is adopted wherein data adjustment blocks compute frequency adjustments from timing data accumulating during overlapping time intervals, and the data adjustment blocks take turns to output frequency adjustment data for the digital controlled oscillator at the receiver every T/M time intervals, where T is the time required to collect enough data to make an adjustment with a single adjustment block, and M is the number of adjustment blocks, and wherein an adjustment block is reset after outputting a frequency adjustment to update the local receiver clock, and variables stored in remaining adjustment blocks are adjusted to compensate for the updating of the local receiver clock, and wherein the compensation adjustments for variables $S_y$ and $S_{xy}$ stored in an adjustment block are given by the expressions $$S_y = S_y + (\alpha_1 - \alpha)(S_x - T_1)$$

$$S_{xy} = S_{xy} + (\alpha_1 - \alpha)(S_{2x} - T_1 \cdot S_x)$$

where $T_1$ is the time elapsed during the data collection of $S_y$, $S_{xy}$, $S_x$ and $S_{2x}$, and $S_x = \Sigma(x_k)$, $S_{xy} = \Sigma(x_k y_k)$, $S_{2x} = \Sigma(x_k^2)$, and $S_y = \Sigma(y_k)$.

13. A method as claimed in claim 12, wherein the transit time over said network is computed from the difference between the transmitter time-stamped packets and the receiver time-stamped packets, and said estimate is computed from transit time.

14. A method as claimed in claim 12, wherein said estimate is a computed least squares estimate.

15. A method as claimed in claim 14, wherein the least squares estimate $\hat{\alpha}$ is computed in accordance with the formula:

$$\hat{\alpha} = \frac{\sum x_k y_k - \frac{1}{N} \sum x_k \sum y_k}{\sum x_k^2 - \frac{1}{N} (\sum x_k)^2}$$

where $x_k = k \cdot T \cdot f_{ox}$, $y_k = \alpha \cdot x_k + v_k$, where k is an index, T is the time interval between consecutive timing packets, and $v_k$ represents the network delay variation plus a phase offset.

* * * * *